(12) United States Patent
LaCoste

(10) Patent No.: US 6,810,568 B1
(45) Date of Patent: Nov. 2, 2004

(54) REFRIGERANT COPPER LINE PROTECTOR AND METHOD OF REPAIRING

(76) Inventor: Marvin LaCoste, P.O. Box 292, Kiln, MS (US) 39556

( * ) Notice: Subject to any disclaimer, the term of this patent is extended or adjusted under 35 U.S.C. 154(b) by 0 days.

(21) Appl. No.: 10/618,989

(22) Filed: Jul. 14, 2003

(51) Int. Cl.$^7$ ............................. B23P 6/00; B23P 23/00; B29C 73/00; E04C 2/52
(52) U.S. Cl. ............................. 29/402.08; 29/402.01; 29/402.03; 52/220.8
(58) Field of Search ................. 29/402.01, 402.03, 29/402.06, 402.08, 402.09, 402.11; 52/220.8; 248/56; 285/192

(56) References Cited

U.S. PATENT DOCUMENTS

| | | | |
|---|---|---|---|
| 4,087,946 A | | 5/1978 | Harris |
| 4,656,689 A | * | 4/1987 | Dennis ..................... 16/2.2 |
| 5,101,712 A | | 4/1992 | Dean, Jr. |
| 5,174,077 A | | 12/1992 | Murota |
| 5,560,397 A | | 10/1996 | Miller et al. |
| 5,687,581 A | | 11/1997 | Price |
| 5,729,938 A | | 3/1998 | Tobias |
| 6,336,338 B1 | | 1/2002 | Koren |
| 6,530,187 B2 | | 3/2003 | Shimizu |
| 2002/0133963 A1 | | 9/2002 | Polk, Jr. |

\* cited by examiner

*Primary Examiner*—John C. Hong
(74) *Attorney, Agent, or Firm*—Garvey, Smith, Nehrbass & Doody, L.L.C.; Gregory C. Smith

(57) ABSTRACT

A protector system for a soft flexible refrigeration line as it exits an exterior wall of a building. The system comprises an elongated inflexible tube, made of such as PVC or the like, which extends through an opening in the wall of the building, with a portion of tube extending into the gap between the interior and the exterior wall and a portion of the tubing extending outside of the wall. The refrigeration line would run through the tube, and extend from the outer most end of the tubing projecting out from the wall. There would further be provided a cut or etched line along the exterior portion of the tube, so that should the soft flexible refrigerant line which extends from the outer end of the tube be crimped at that point, the part of the exterior tube extending from the cut or etched line could be then snapped or cut off, which would expose a portion of the flexible refrigerant line that is not crimped. The flexible line could then be cut at that point, and the splice be made easily while the line is still exterior to the building.

11 Claims, 2 Drawing Sheets

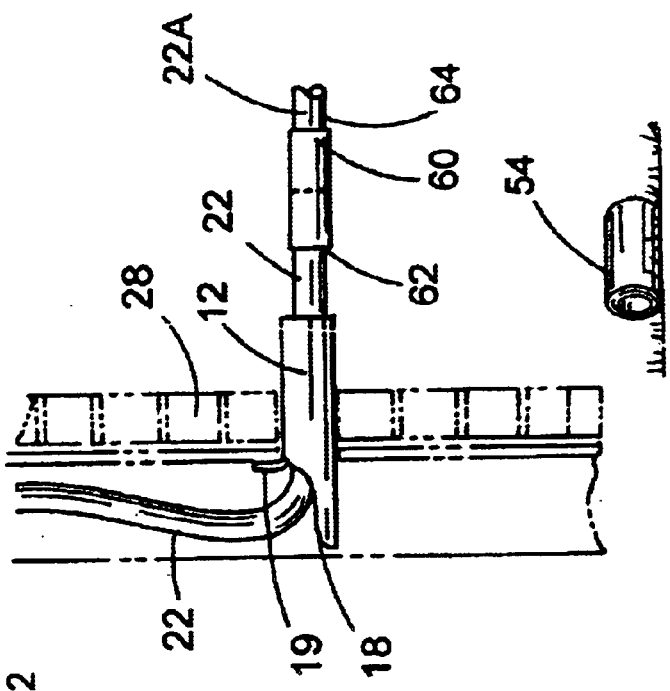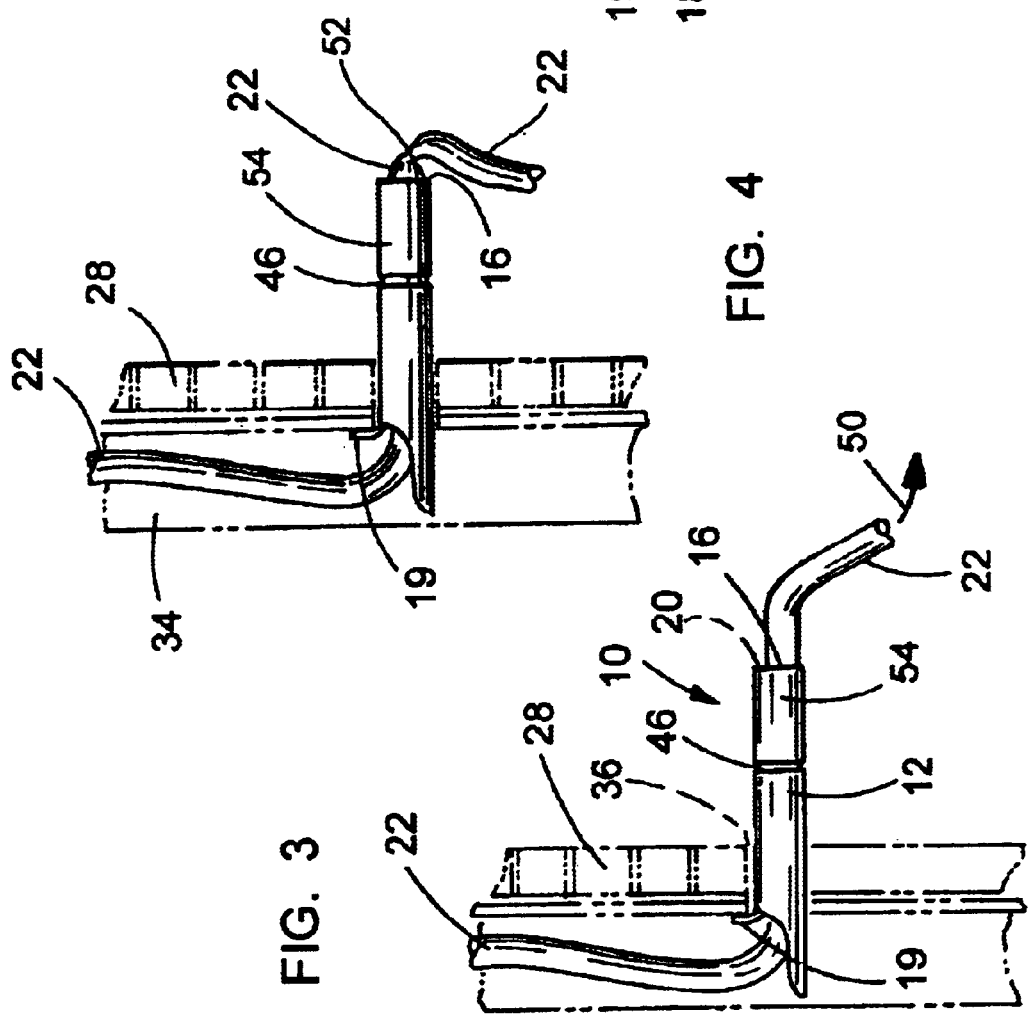

REFRIGERANT COPPER LINE PROTECTOR AND METHOD OF REPAIRING

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to refrigeration lines. More particularly, the present invention relates to a system for protecting a substantially flexible refrigeration line during construction of a building, so that if a crimp occurs in the line, the crimped area can be removed and the line can be safely spliced exterior to the building.

2. General Background of the Invention

It is very common in the construction of buildings, particularly where buildings are constructed with an outer wall or brick or like material, that the refrigeration which may be placed within the building includes a flexible line that would extend to the exterior of the building which may then connect to one or a series of compressor systems for providing the necessary flow of refrigerant into the building to the inside evaporator coil. Since the flexible line is usually a large copper or other type of material line which is then insulated, the line must exit the building normally through an opening in the wall of the building so that the line can go through the opening and can go out into the exterior part interconnecting the compressor system. Since this must be done during construction, there is a possibility that at the point that the soft flexible copper line extends from the wall of the building, it is susceptible to being damaged or crimped by inadvertent dropping of things on the line or contact with the line with construction materials. When such a crimping occurs, it may occur at the very point that the line exits the building wall. If this is the case, it is very difficult to reshape the line; so therefore, normally the line must be cut at some point prior to the crimp and the remainder of the line spliced to replace the portion that has been cut from the line. If one could imagine that if the crimp occurs right at the edge of the outer face of the wall, then there is very or no line that can be cut since the line is interior to the building and presents quite a problem. Also, there is a danger of high heat present when soldering repair is performed. Therefore, there is a need in the art that this problem be addressed which will be done by the present invention.

BRIEF SUMMARY OF THE INVENTION

The method and apparatus of the present invention solves the problems in the art in a simple and straight forward manner. What is provided is a protector system for a soft flexible refrigeration line as it exits an exterior wall of a building. The system comprises an elongated inflexible tube, made of PVC or the like material, which extends through an opening in the wall of the building, with a portion of tube extending into the gap between the interior and the exterior wall, and a portion of the tubing extending outside of the wall. The refrigeration line would run through the tube, and extend from the outer most end of the tubing projecting out from the wall. There would further be provided a cut or etched line around the exterior portion of the tube, so that should the soft flexible refrigerant line which extends from the outer end of the tube be crimped at that point, the part of the exterior tube extending from the cut or etched line could be then snapped or cut off, which would expose a portion of the flexible refrigerant line that is not crimped. The flexible line could then be cut at that point, and the splice be made easily while the line is still exterior to the building.

Therefore, it is a principal object of the present invention to provide a system for allowing the restoration and splicing of a soft refrigerant line in the event crimping occurs in the line exterior to the outer wall of the building;

It is a further object of the present invention to provide a system which protects a refrigerant line extending from exterior to a building and allows for easy splicing of the line should a crimp occur in the line;

It is a further object of the present invention to provide a method of protecting a soft refrigerant line extending from the exterior of a building so that should a crimp occur in the line, the steps can be taken to cut the line and splice new line onto the refrigerant line so that it can be used.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIGS. 3–5 illustrate steps in the utilization of the protective system of the present invention as illustrated.

DETAILED DESCRIPTION OF THE INVENTION

Figure 1:
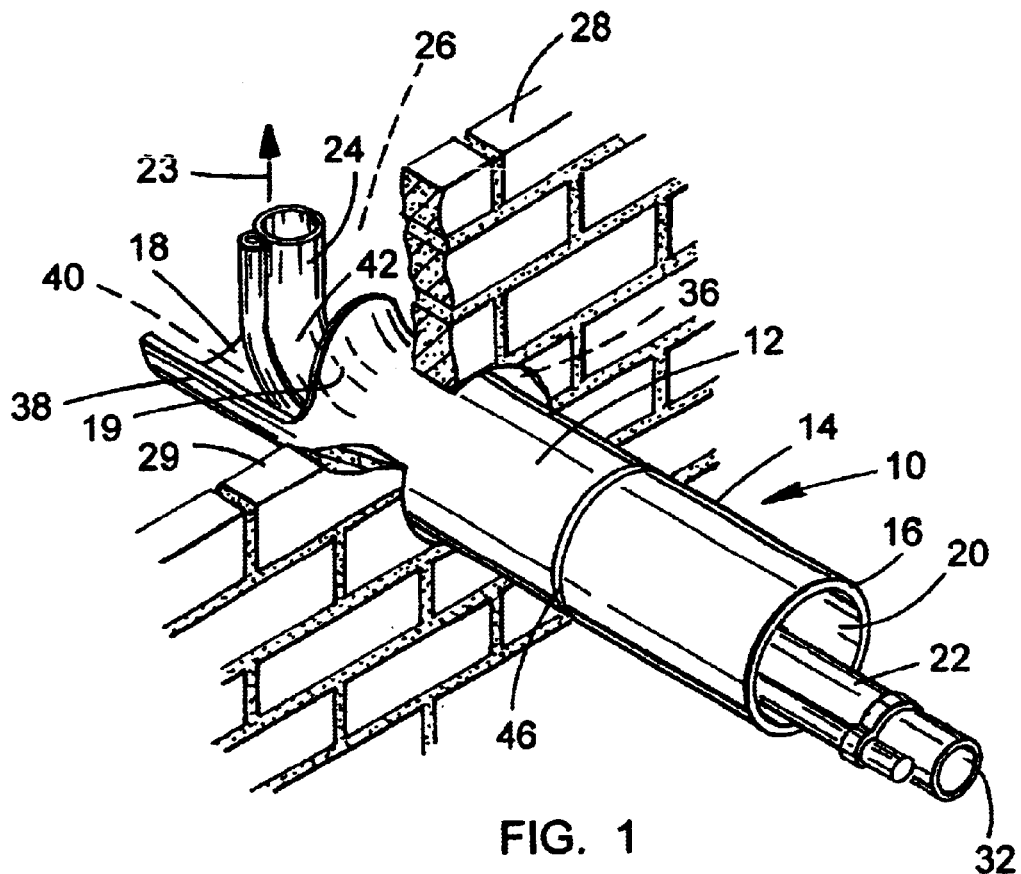
FIG. 1 illustrates an overall perspective view of the preferred embodiment of the present invention.

FIGS. 1–5 illustrate the preferred embodiment of the apparatus of the present invention by the numeral 10. As illustrated in full view in FIG. 1, there is illustrated the protective system 10 which includes an elongated inflexible tube portion 12 having a continuous side wall 14, an outer end 16 and an inner end 18. The inner end 18 of tube 12, interior to a wall 28 would include an upper curved portion 19, so that in the event the copper refrigeration line 22 would be pulled up in the direction of arrow 25, it would follow a long radius 90 degree bend. The tube 12 would have a large opening 20 there through for accommodating the refrigeration line 22 of the type as illustrated in FIG. 1. As stated earlier, the refrigeration line 22 would be of the type that would be constructed of a soft flexible material, such as copper 24, and would extend from an interior space 26 of the exterior building wall 28 and would be directed to the exterior 30 of the building to a point which is shown at the end 32 of line 22.

Figure 2:
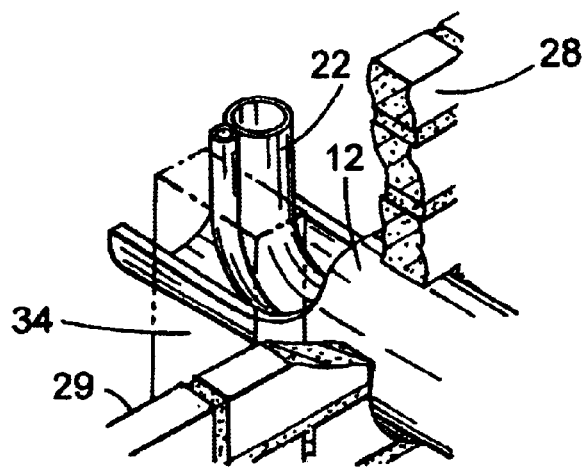
FIG. 2 illustrates a partial view of the overall system of the present invention.

As seen in partial view in FIG. 2, the system 10 may be mounted next to a stud 34 which would be positioned upright on the interior surface 29 of wall 28 as is very commonly done in building construction. The tube 12 may be mounted adjacent stud 34 so as to give it some support as it is positioned within an opening 36 in wall 28. As seen further in FIG. 1, there is provided an interior portion 38 of tube 12 which could be defined as that portion which extends from the interior surface 29 of wall 28 to the inner end 18 as illustrated in FIG. 1. As seen, there is a cut out 40 which has been cut away from a large portion of the interior portion of 38 of tube 12 so as to accommodate the line 22 as it makes its bend 42 interior to wall 28 and is projected upward in the direction of arrow 23 to the upper portion of the building where it may be continued to be utilized in the refrigeration system. This cutout is necessary since the gap 26 between the exterior wall 28 and an interior wall, such as sheet rock or the like, is normally the width of the stud 34. It is important that the line 22 be turned up as seen in FIG. 2 so that it could run up along side of stud 34 and be held in place against stud 34 during use.

As seen also in FIG. 1, there is illustrated a continuous circular line 46 which is defined as an etched or cut line into the wall 14 of outer tube 12, which would define a portion 13 of tube 12 that will be discussed further. This line is a very important part of the system, and will be discussed when reference is made to FIGS. 3–5.

Turning now to FIGS. 3–5, in FIG. 3 it is seen that again there is the exterior wall 28, which supports a series of studs 34. There is illustrated the refrigeration line 22 descending downward into the cutout portion 40 of tube 12 of the protective system 10, and extending through the entire opening 20 of the tube 12 and extending outward in the direction of arrow 50. As seen, the outer tube 12 is mounted within the opening 36 in wall 28. In FIG. 3, it should be noted that the copper line 22 within tube 12 is functional and has no damage.

Turning now to FIG. 4, FIG. 4 represents the same view of the system as seen in FIG. 3 but for the fact that the copper line 22 has exited the end 16 of the tube 12 and has been knocked or hit in some manner so as to cause a crimping point 52 in the wall of the tube 22. Such a crimp in such a flexible tube such as copper or the like is very difficult, if not impossible, to reformulate into a circular tube. Therefore, it is widely known in the art that in order to address such a crimp, one is forced to cut the line 22 at a point rear of the crimp 52 and reestablish a splice in the line 22. This is done in the following fashion. Again, reference is made to the etched line 46 formed in the wall 14 of tube 12. This cut or etching in the wall is important since it allows one to make a deeper cut along line 46, and in fact cut the entire portion 54 extending from the cut 46 to the end 16 of tube 12. When this portion 54 is cut from the tube it exposes a length of line 22 interior of the crimp 52. When the portion 54 has been completely severed from tube 12, it is removed by simply sliding off of the crimped portion of line 22. As seen in FIG. 5, this portion 54 has been discarded, and therefore would leave a length of tube 22 exposed, whereby a second portion 22A of the tube could then be engaged within a common collar or repair coupling 60 with the coupling 60 soldered or the like on its ends 62, 64 to the two lengths of tubes 22, 22A so that one would then have a continuous length of line 22 extending from the outer portion of the building. It is foreseen that the remaining portion of outer tube 12 would remain in place within wall 28 during use of the refrigerant line after the building has been completed.

The foregoing embodiments are presented by way of example only; the scope of the present invention is to be limited only by the following claims.

What is claimed is:

1. An apparatus for protecting a refrigeration line against crimping, the apparatus comprising:
    a) a length of solid hollow tubing, with a first end of the tubing extending into an inner space of a building wall, and a second end of the tubing extending out of the exterior of the building wall;
    b) a length of flexible refrigerant line running which extends through the building wall space through an opening in the tubing and extends out from an outer end of the tube;
    c) an etched line along the wall portion of the tube, positioned at a point so that the etched line may serve as a means for cutting an exterior portion of the tube from the tube body in the event the refrigerant line is crimped so as to expose a greater portion of uncrimped refrigerant line but may be cut and spliced as needed.

2. The apparatus in claim 1, wherein the inflexible hollow tubing comprises PVC pipe.

3. The apparatus in claim 1, wherein the first end of the tubing further comprises an upper wall portion cutaway for allowing the refrigerant line to enter the tubing from the top.

4. The apparatus in claim 1, wherein the tubing is positioned adjacent a stud within the inner building wall space.

5. An apparatus for protecting a refrigeration line extending from the exterior wall of a building against crimping, the apparatus comprising:
    a) a length of inflexible hollow tubing, with a first end of the tubing extending into an inner space of a building wall, and a second end of the tubing extending out of the exterior of the building wall;
    b) the first end of the tubing having a cutaway in an upper wall portion;
    c) a length of flexible refrigerant line positioned in the building wall space, and extending downward, the refrigerant line entering the tubing through the cutaway in the upper wall portion of the tubing, and extending out from the second end of the tubing;
    c) an etched line along the wall portion of the tubing adjacent the second end, so that the etched line may serve as a means for removing an exterior portion of the tube along the etched line in the event the refrigerant line is crimped so as to expose a greater portion of uncrimped refrigerant line that may be cut and spliced as needed;
    d) a repair coupling positioned over the uncrimped portion of the line, so that a second refrigerant line may be engaged by the coupling to define the splice in the line.

6. The apparatus in claim 5, wherein the tubing is positioned through an opening in the exterior building wall adjacent a vertical stud member.

7. The apparatus in claim 5, wherein the tubing would comprise PVC or some inflexible equivalent material.

8. The apparatus in claim 5, wherein the first end of the inflexible hollow tubing extending into the building space would further comprise an upper curved end for allowing a length of copper line to bend upward along the curved end to form a 90 degree bend without crimping the line.

9. A method of repairing a refrigerant line after crimping, comprising the following steps:
    a) providing a soft, flexible refrigerant line extending through an opening in the exterior wall of a building;
    b) providing an inflexible protective hollow tube positioned within an opening of the exterior wall of a building, the protective tube having a first end extending within a wall space in the building and a second end extending exterior to the exterior wall of the building;

c) threading the flexible refrigerant line through the protective hollow tube so that the refrigerant line extends exterior to the second end of the tube;

d) providing an etched line in the wall of the protective hollow tube at a point between the building wall and the second end of the tube;

e) receiving a crimp in the flexible refrigerant line at a point beyond the second end of the protective tube;

f) cutting off and removing a portion of the protective tube along the etched line in the tube wall so as to expose a sufficient portion of the refrigerant line extending from the second end of the tube for splicing onto a new section of refrigerant line.

10. The method in claim 9, further comprising the step of removing a portion of the upper wall of the protective tube adjacent the first end so as to allow the refrigerant line to be threaded into the protective tube from a point above the tube.

11. The method in claim 9, further comprising the step of providing a collar around the splice in the refrigerant line so as to provide a secure splice in the line.

* * * * *